Oct. 6, 1953   G. D. BEAUDRY ET AL   2,654,378
BALL BEARING WASHING MACHINE
Filed Dec. 29, 1948   5 Sheets-Sheet 4

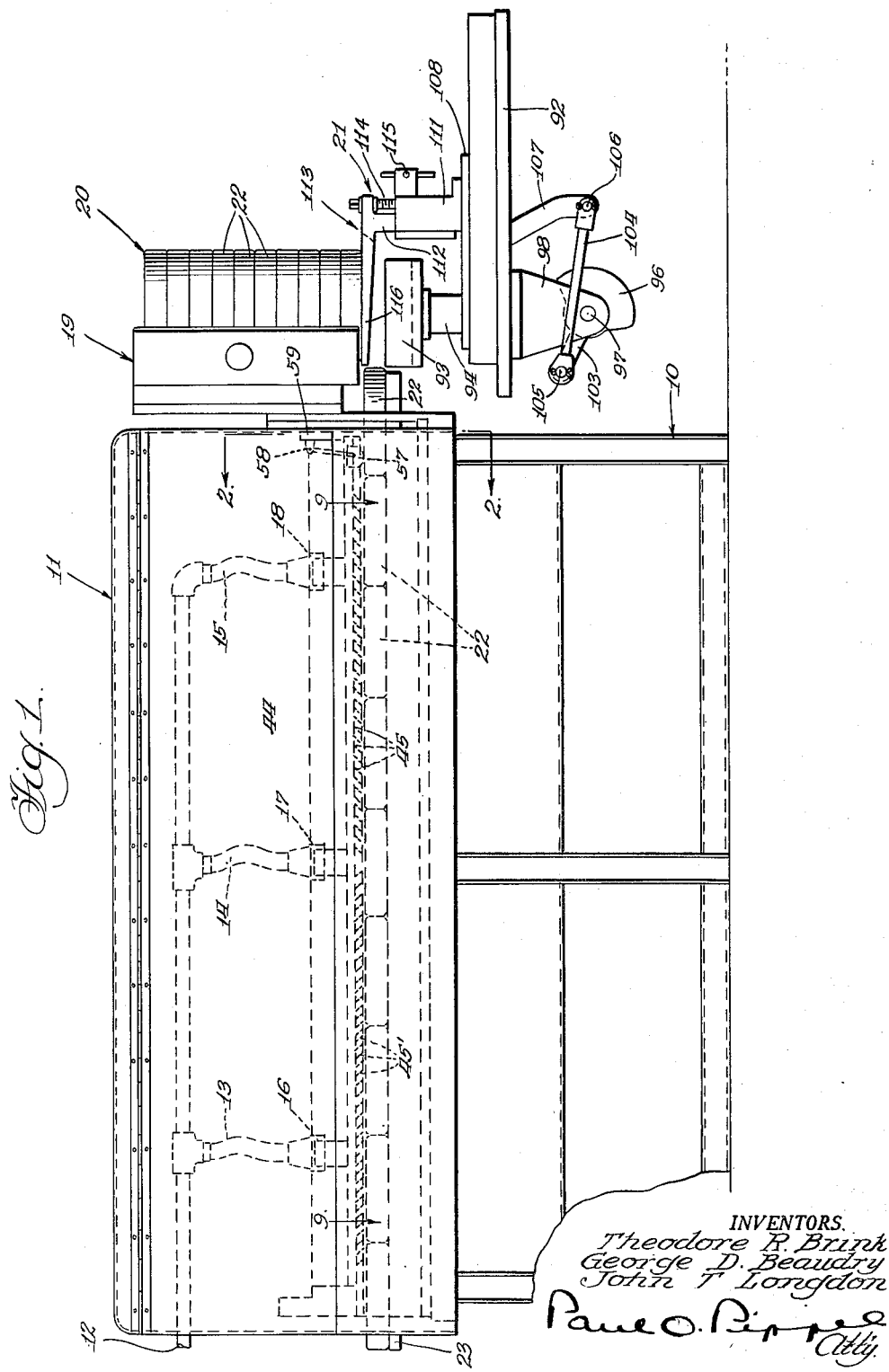

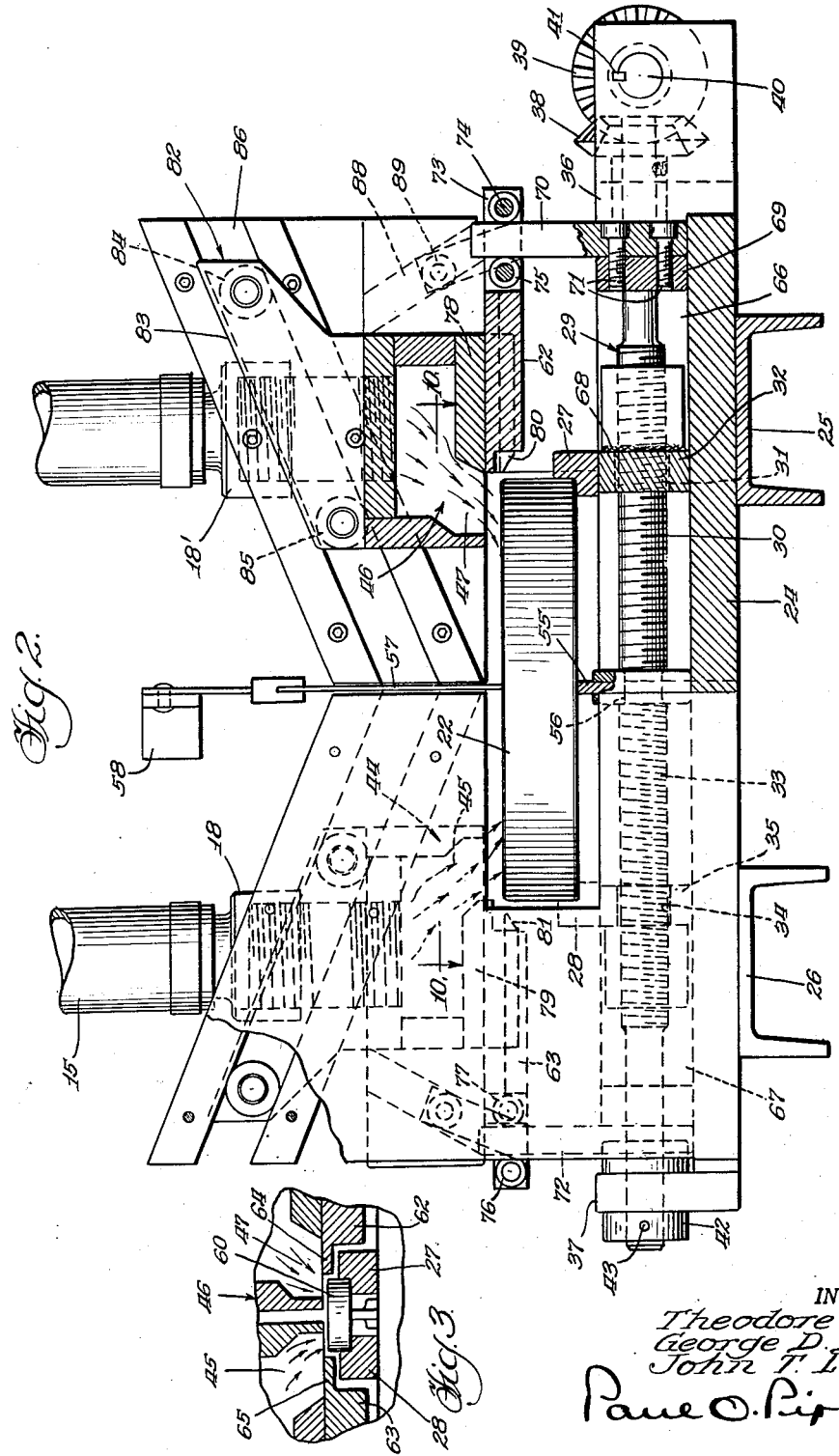

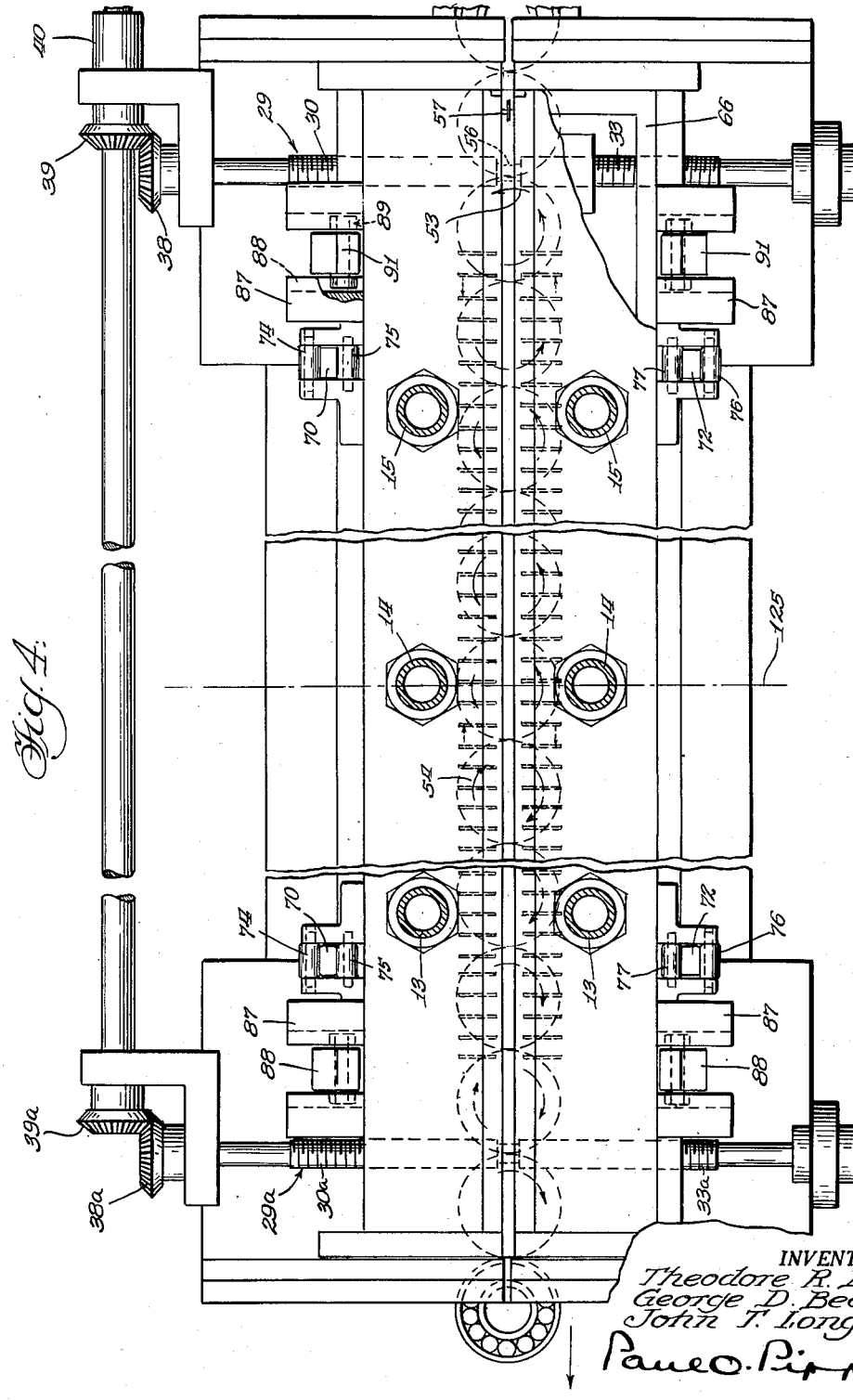

INVENTORS.
Theodore R. Brink
George D. Beaudry
John T. Longdon
Paul O. Pippel Atty.

Oct. 6, 1953  G. D. BEAUDRY ET AL  2,654,378
BALL BEARING WASHING MACHINE
Filed Dec. 29, 1948                                    5 Sheets-Sheet 5
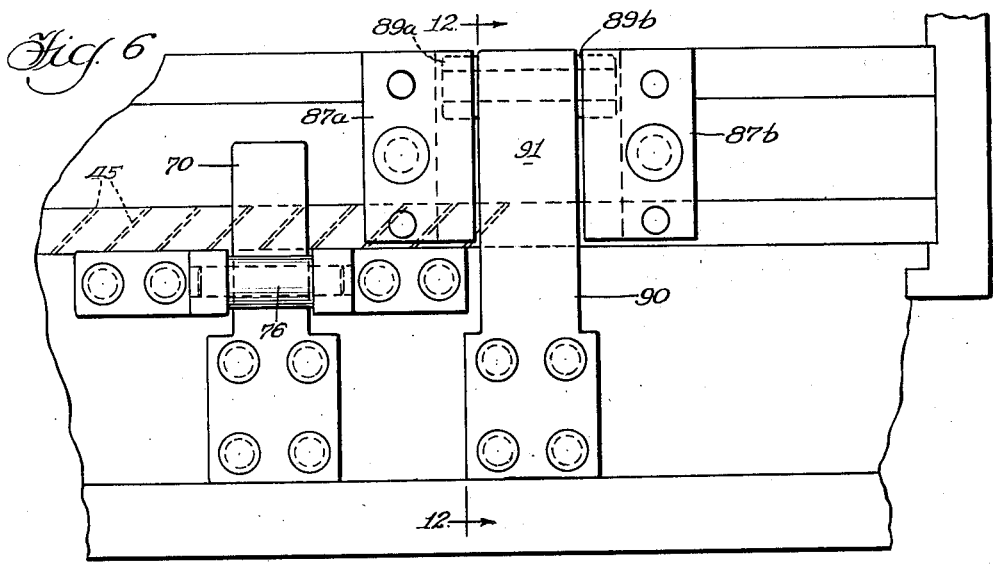
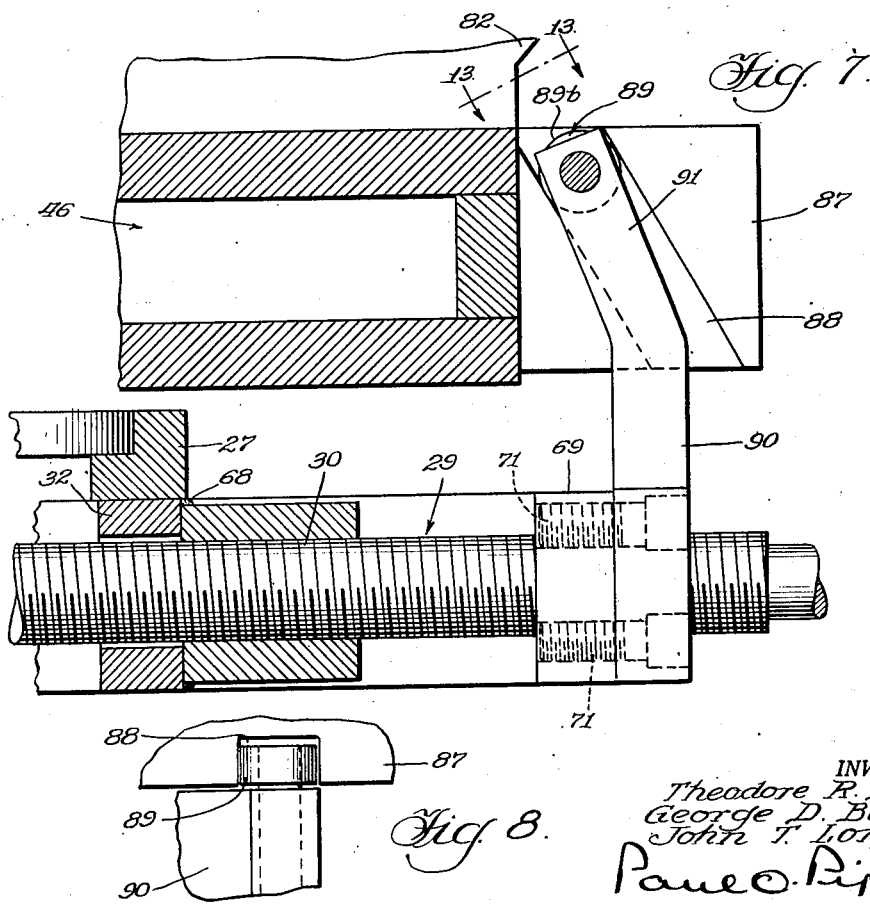
INVENTORS.
*Theodore R. Brink*
*George D. Beaudry*
*John T. Longdon*
Paul O. Pippel
Atty.

Patented Oct. 6, 1953

2,654,378

UNITED STATES PATENT OFFICE 2,654,378

BALL BEARING WASHING MACHINE

George D. Beaudry and John T. Longdon, Chicago, Ill., and Theodore R. Brink, Michigan City, Ind., assignors to International Harvester Company, a corporation of New Jersey Application December 29, 1948, Serial No. 67,848

7 Claims. (Cl. 134—112)

1

This invention relates to a new and improved ball bearing washing machine.

In the manufacture of bearings and particularly ball bearings, the tolerances of the inner and outer races and of the intermediate balls are very critical. Further, the finish or polish on the rubbing surfaces is a very important factor in the success or failure of any ball bearing. It is therefore foreseeable that particles of metal or dirt becoming accidentally deposited on these finished surfaces will cause abrasion and scratching which will alter the desired bearing operation as well as in certain instances destroy the very critical tolerances maintained during the manufacture of the bearing. It is therefore very important to thoroughly wash the bearings after manufacture and before use.

A principal object of this invention is to provide a machine for washing ball bearings for the purpose of removing all foreign particles from the bearing surfaces thereof.

An important object of this invention is the provision of means in a ball bearing washing machine for adjusting the machine to accommodate various sizes of bearings.

Another important object of this invention is to supply an adjustable ball bearing washing machine capable of washing any size bearing and means associated with the adjustment for bearing size to automatically vary the size and quantity of the impinging stream of washing liquid.

A further important object of this invention is to provide means for laterally feeding a single bearing from the bottom of a vertical stack of bearings.

Another and further important object of this invention is the provision of a ball bearing washing device in which streams of washing liquid are directed at the bearing from opposite sides and at an incline and arranged in such a manner that the inner race rotates with respect to the outer stationary race during washing thereof.

Other and further important objects of this invention will become apparent from the disclosures in the following specification and accompanying drawings, in which:

Figure 1 is a side elevational view of the ball bearing washing machine of this invention.

Figure 2 is a sectional view taken on the line 2—2 of Figure 1.

Figure 3 is a detailed sectional view of a portion of the device as shown in Figure 2 adapted for operation with a smaller size bearing.

Figure 4 is a plan view of an inner portion of the washing machine showing a successive line of ball bearings and taken on the line 9—9 of Figure 1.

Figure 6 is an enlarged top plan view of a portion of the washing machine.

Figure 7 is a sectional view taken on the line 7—7 of Figure 6.

Figure 8 is a detail of a portion of the device as viewed from line 8—8 of Fig. 6.

As shown in the drawings:

Figure 5:
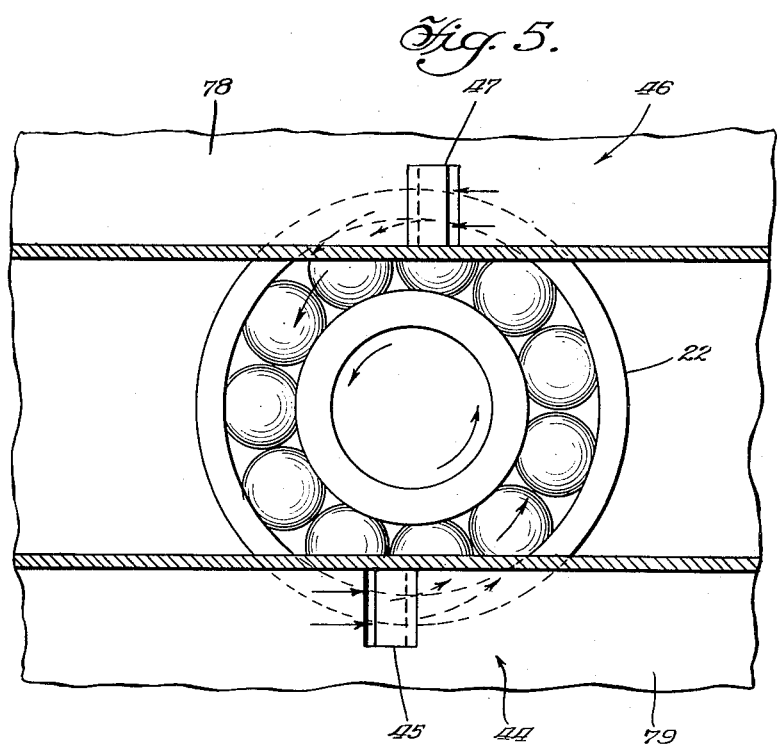
Figure 5 is a sectional detail view taken on the line 5—5 of Fig. 2.

The reference numeral 10 indicates generally a supporting structure or framework on and in which is mounted a bearing washing machine 11. A wash fluid such as a very thin lubricating oil is applied under pressure to the conduit 12, whereupon it is circulated through the washing machine and is delivered by means of conduits 13, 14 and 15 to fittings or the like 16, 17 and 18 respectively.

A bearing magazine 19 is adapted to receive and maintain a substantially vertical stack of bearings 20. A feeding mechanism 21 is adapted to slide the bottom bearing of the vertical stack 20 therefrom without upsetting the other bearings in the stack and pushing it longitudinally into the washing machine 11. As shown in Figure 1, the bearings 22 within the washing machine are in continuous end-to-end relationship and as they are advanced by the insertion of succeeding bearings from the stack 20 they are washed by means of the lubricant wash from the nozzles 16, 17 and 18. The bearings are continuously washed throughout the entire length of the washing machine 11 and are discharged at 23 at the far end of the washing machine.

As best shown in Figure 2, the washing machine 11 comprises a base plate 24 mounted on longitudinally extending channel members 25 and 26 which form a part of the supporting framework. L-shaped track members 27 and 28 are spaced apart laterally on the bed plate 24 and are adapted to be moved toward and away from each other by means of a turnbuckle screw 29 having a threaded portion 30 engaging a threaded aperture 31 in a downwardly extending portion 32 of the track member 27. The turnbuckle screw has an oppositely threaded portion 33 threadedly engaging an aperture 34 in a downward extension 35 of the spaced apart track 28. The threads are so arranged that upon rotation of the turnbuckle 29 the tracks 27 and 28 are carried inwardly toward each other or away from each other depending upon the direction of rotation of the screw 29. Vertically extending bracket members 36 and 37 at the extreme sides of the washing machine 11 and extending upwardly from the base plate 24 journally support the turnbuckle screw 29. A bevel gear 38 is fixedly mounted on one end of the shaft 29 and is operatively engaged with a second bevel gear 39 mounted on a shaft 40 by means of a key 41. It will thus be apparent that rotation of the shaft 40 will cause the adjustable positioning of the spaced apart bearing tracks 27 and 28. An end thrust washer 42 is mounted on the other end of the turnbuckle shaft 29 by means of a pin 43 insuring that the turnbuckle screw remain in fixed lateral position with respect to the base plate 24.

As best shown in Figures 2 and 4, the bearings 22 to be washed are slidably mounted on the track members 27 and 28. The fittings 16, 17 and 18 are associated with a longitudinally extending nozzle 44 having a plurality of slits 45 which are adapted to be directed upon the bearings 22 as they pass along the track members 27 and 28. Duplicate conduit fittings 16', 17' and 18' are positioned directly opposite the fittings 16, 17 and 18, respectively, and are adapted to feed the liquid wash to a second elongated nozzle 46 which lies parallel to the nozzle 44 and spaced therefrom. The nozzle 46 similarly contains a plurality of spaced slits 47 through which the wash liquid passes to contact the other side of the annular bearings 22. The nozzles 44 and 46 have their stream directing slits inclined in such a manner that the inner races 48 thereof, along with the balls 49, are rotated with respect to the outer race 50 which is held substantially against rotation by the frictional engagement with the track members 27 and 28 and also the frictional engagement caused by the abutting of the ball bearings with each other during the feeding of the bearings along the longitudinally extending track. The nozzle 44, as viewed in Figure 1, has the slits 45 inclined at an angle from a high portion at the feeding end of the washing machine to a low discharge portion at the discharge end of the washing machine. The slits 45 are so directed for approximately one-half the length of the washing machine as defined by the conduit 14 and fitting 17. Thereafter, for the remaining extent of the washing machine or approximately the last half thereof, the slots in the nozzle 44 are designated by the numeral 45' and are inclined in a direction opposite to that of the slots 45. The slots 45' have their high point at the discharge end of the washing machine and are inclined downwardly in a direction toward the feeding end of the washing machine. As best shown in Figure 4, the slots 47 in the nozzle 46 refer to the slots in that half of the washing machine nearest the feeding end thereof, and the slots or slits 47' refer to those positioned in the last half of the nozzle 46 or that half adjacent the discharge end of the washing machine. The slits 47 are inclined opposite to that of the slits 45 and hence are similar in inclination to the slits 45' wherein the high portion is adjacent the discharge end of the washing machine and thereupon is inclined downwardly toward the feeding end of the washing machine. In the same manner that the slits 45' are inclined opposite with respect to the slits 45, the slits 47' are inclined in a direction opposite to the inclination of the slits 47 and as a result are inclined in the same direction as the slits 45 in which the high portions thereof are adjacent the feeding end of the washing machine and thereupon are inclined downwardly toward the discharge end of the washing machine. As the bearings 22 are moved along the tracks 27 and 28 by reason of succeeding bearings from the stack 20 being inserted into the machine, the streams of wash liquid fed to the slits 45 and 47 enter or impinge against the surface of the bearings in such a manner that the slits 47 tend to drive the inner race and balls 48 and 49 respectively in a direction as indicated by the arrow 51, whereas the stream passing through the inclined slits 45 tend to rotate the movable bearing parts in a direction as indicated by the arrow 52, with the net result that the inner portions of the bearing are rotated in a counter-clockwise direction as viewed in Figure 4 and indicated by the arrows 53. The liquid wash thoroughly soaks the bearings 22 and stirs up and removes any grit or filings that may be lodged on the critical polished bearing surfaces. The moving parts of the bearings are first rotated in a counter-clockwise direction throughout the entire first half of the washing machine, and immediately upon the bearings passing the central dividing line, the oppositely inclined slits 45' and 47' reverse the direction of rotation of the inner races 48 and balls 49. The movable portions of the bearings thus rotate in a clockwise direction as indicated by the arrows 54 as viewed in Figure 4, thus causing a thorough washing of the bearings.

As shown in Figure 2, the bearings 22, when on the track members 27 and 28, are additionally supported centrally thereof by means of a partition or the like 55. This partition 55 rests on a non-threaded central portion 56 of the turn buckle screw 29. The partition 55 is mounted integrally with the base or bed plate 24. A member 57 is hingedly suspended from a bracket 58 which is in turn mounted on the framework or supporting structure of the washing machine as indicated at 59. The member 57, as more specifically shown in Figure 1, rides on the surface of the bearing 22 and is inclined at such an angle that it extends from a high point at the feed end of the washing machine downwardly toward the rearward discharge end of the washing machine so that it in fact acts as a brake against rearward travel of the bearings 22 on the tracks 27 and 28, a tendency which might possibly be occasioned by the impinging streams tending to rotate the bearings.

The bearing 22, as shown in Figure 2 of the drawings, is a relatively large bearing. Figure 3 shows a detail view wherein the track members 27 and 28 have been moved relatively close together to support a considerably smaller annular ball bearing 60. This, of course, is accomplished by rotation of the shaft 40 and thereupon rotation of the turn buckle screw 29 by means of the bevel gears 38 and 39. The slots in the nozzles 44 and 46 for delivering wash fluid to the ball bearings are fully open in the position of the device as shown in Figure 2, whereas in Figure 3 the slits 45 and 47 are relatively restricted by reason of the members 62 and 63 which have lip members 64 and 65, respectively, which in the reduced spacing of the track members move to a position beneath the slots 45 and 47 so that a considerably lesser amount of wash fluid is permitted to be discharged when the device is washing similar bearings.

The members 62 and 63 carrying the lip members 64 and 65 are movable laterally as well as vertically in order to be properly positioned with respect to the openings 45 and 47. A rectangular frame composed of parts 66 and 67 extends around the bearing holding track. The portion 66 is welded to the track member 27 at 68 and the portion 67 is attached to and movable with the track member 28. It will thus be seen that as the right- and left-handed screw 29 is rotated by means of the bevel gears the frame members 66 and 67 are laterally shifted simultaneously with the shifting of the track members 27 and 28. The frame portion 66 is provided with an end across member 69. A first upright member 70 is bolted at 71 to the end across member 69 and thus also is laterally shiftable with the track member 27 and the frame portion 66. The opposite side of the device, that is, the frame portion 67, is similarly constructed with an upright member 72 which performs the identical function to that of the member 70. An extension 73 in the form of a fork carries spaced rollers 74 and 75. The first upright member 70 projects between the rollers 74 and 75 thus providing a source of moving power to effect lateral shifting of the member 62. The rollers reduce the amount of friction thus making for easy movement of the valve sliding member 62. The slide valve member 63 is similarly provided with a pair of spaced rollers 76 and 77 for reception of the upright member 72. It will thus be evident that the slide members 62 and 63 are simultaneously laterally shiftable in opposite directions.

The nozzles 44 and 46 are in the form of relatively long rectangular housings having bottom portions 78 and 79 adjacent the inclined openings 45 and 47. The slide members 62 and 63 are held to the bottoms 78 and 79 by means of gibs 80 and 81 positioned at opposite ends of the respective slides 62 and 63. The slide members 62 and 63 are thus precluded from separate vertical movement with respect to the nozzles 44 and 46 but are permitted relative lateral movement with respect to each other for the purpose of controlling the opening of the slots 45 and 47.

The nozzle 46 is equipped with an upwardly extending portion 82 which has an inclined top 83 and spaced roller members 84 and 85. An inclined track 86 in the supporting structure 10 extends from a relatively high point on the outside of the machine to a lower point substantially centrally of the machine. The rollers 84 and 85 are adapted to slidingly engage the track 86, and thus by reason of the lateral shifting of the nozzle 46 the entire nozzle moves in a path similar to the inclined track 86. The nozzle 46 thus has both lateral and vertical movement with respect to the base plate 24 and thus also the supporting structure 10.

The nozzle 46 is further provided with a lateral extension 87 as best shown in Fig. 7. This extension 87 has a slot 88 inclined across the surface thereof and adapted to receive and guide a roller 89 carried by a second upright member 90 attached to the frame or yoke 66 in a plane spaced from the first upright member 70. The roller and slot engagement is further shown in Fig. 13 and it is thus apparent that rotation of the right- and left-hand thread screw 29 will cause a lateral shifting of the nozzle 46 by reason of the roller 89 engaging the walls of the extension 87. The upright member 90 is angled at the top thereof as shown at 91. The inclination of the portion 91 is slightly different from that of the inclination of the slot 88, and thus lateral shifting of the member 90 causes less lateral movement of the nozzle 46 than if the member 91 and cooperative slot 88 were both vertically disposed. Fig. 6 shows the relative positioning of the upright members 70 and 90. The roller 89 is formed in two parts 89ª and 89ᵇ, which are positioned on opposite ends of the member 90, and the lateral extension 87 of the nozzle 46 is similarly provided with spaced portions indicated by the numerals 87ª and 87ᵇ within which the rollers 89ª and 89ᵇ slide. The nozzle 44 is equipped with similar moving devices and they will not be assigned further reference characters for the reason that the drawings would be unduly cluttered with a plurality of numbers. The position of the nozzle 46 with respect to the large bearing 22, as shown in Fig. 2, is such that the opening 47 is fully uncovered by means of the slide valve member 62 and the nozzle is spaced considerably above the bearing holding track member 27 to give ample space to the relatively deep bearing 22.

As shown in Fig. 3, the valve member 62 has substantially closed the inclined opening 47 for directing the impinging stream on the small bearing 60. Further, the nozzle 46 has moved downwardly to a position relatively close to the track member 27, and the track member 27 has moved laterally inwardly to properly support this small bearing. The relative movement of the slide member 62 with respect to the nozzle 46 is accomplished by the direct and full movement of the slide member 62 by the vertically disposed member 70 and the relatively slow lateral movement of the nozzle 46 by the inclined slot 88 and its cooperative rollers 89. The device is thus arranged and constructed so that a simple rotational movement of the shaft 40 will accomplish a proper adjustment for bearings of all sizes. It is believed that Fig. 9 best shows the passing of the bearings to be washed through the washing machine of this invention. The bearings are in single file and mounted on the tracks 27 and 28 as previously described. The feeding mechanism is very important to the successful operation of this washing machine, and thus it is believed necessary to specifically show and describe the operating elements of this feeding mechanism. The feeding mechanism 21 consists of a carrying structure 92. The carrying structure 92 extends beneath the magazine 19 and thus also beneath the vertical column of bearings 20 to be washed. A vertically movable table or the like 93 is adapted in certain instances to support the vertical column of bearings 20. The member 93 has a downwardly extending shaft or piston member 94 journally mounted in the carrying structure 92 the lower end of which is adapted to be engaged by a cam member 96. The cam member 96 is mounted for rotation on a shaft 97 supported by bearing brackets 98 depending from the carrying structure 92. The feeding mechanism thus depends for its activity upon rotation of the shaft 97 and thus the cam 96 which controls the cycle of operations of the feeding mechanism elements. An arm 103 is mounted on the shaft 97 for simultaneous rotation therewith.

A connecting link 104 joins the outer end of the arm 103 at 105 and at its other end is connected at 106 to a downwardly depending arm 107. The depending arm 107 is attached to the under side of a laterally sliding member 108 which is mounted for sliding movement. The slide member 108 has mounted thereon a block member 111 carrying a vertical shank member 112 of a forwardly extending fork-like member 113. The shank member 112 is adjustably locked in the block 111 by means of vertical adjusting screws 114 and a horizontally disposed set or locking screw 115. The fork 113 is composed of a plurality of spaced fingers 116.

As best shown in Fig. 4, the lateral adjustment of the track members 27 and 28 is accomplished by the right- and left-hand screw 29 as previously described with particular reference to Fig. 2 of the drawings. In order that the relatively long tracks and nozzles may be moved uniformly throughout the entire length thereof, a second turn buckle screw 29ª is provided at the opposite end of the machine from the position of the screw 29, and the elements causing shifting of the track members 27 and 28 and shifting of the nozzles 44 and 46 as well as the nozzle closure members 62 and 63 are duplicated around and adjacent the turn buckle screw 29ª in the same manner as the elements effecting movement of these parts adjacent the turn buckle screw 29. The shaft 40 adapted to drive the double gear 39 is continued along the side of the bearing washing machine to the point where it joins a bevel gear 39ª for imparting rotation to the bevel gear 38ª which in turn directly rotates the screw member 29ª.

As previously described, the impinging streams of wash liquid from the nozzles 44 and 46 are arranged in such a manner that for the travel of the bearings through the first half of the machine up to the center line as indicated by the numeral 125, the inner race of the balls of the bearings are caused to rotate in one direction as indicated by the arrows 53 and in the opposite direction as indicated by the arrows 54 when the bearings pass the center line 125. The angular disposition of the slots 45 and 47 in the nozzles 44 and 46 is best shown in the enlarged detail of Fig. 5.

It will be apparent that herein is provided a ball bearing washing machine which will effectively wash bearings of various sizes with very simple and easy adjusting therefor. In the operation of the machine, bearings are applied to the magazine 19 whereupon they are fed individually from the bottom of the stack thereof into the washing machine along the tracks 27 and 28. The nozzles 44 and 46 cause impinging streams of wash fluid to be directed on the surfaces of the bearings in such a manner that the inner race rotates with respect to the outer race. Any foreign matter is therefore flushed out from in and around the balls and their inner and outer races. In order that the rotating bearings may not back up on the tracks 27 and 28 due to the rotation of the inner parts thereof, a retracting member 57 is provided. When the bearings pass the center line 125 of the washing machine, the angular inclination of the nozzle slots is changed to cause an opposite rotation of the inner ball bearing races, and thus it is believed that all foreign matter which may be deposited on the bearings will be thoroughly washed therefrom. The washed bearings are then discharged from the end of the machine whereupon they are wrapped and packaged for shipment.

Numerous details of construction may be varied throughout a wide range without departing from the principles disclosed herein, and we therefore do not propose limiting the patent granted hereon otherwise than as necessitated by the appended claims.

What is claimed is:

1. A ball bearing washing machine comprising a supporting structure, longitudinally extending, spaced, parallel track members carried on said supporting structure, said track members adapted to slidably receive annular bearings, nozzle means disposed above each of said track members and carried on said supporting structure, said nozzle means having openings arranged and constructed to direct streams of wash fluid on the bearings on said track members, valve means on each of said nozzle means for regulating the flow of wash liquid therefrom, means on said supporting structure associated with the track members, nozzle means, and valve means for effecting lateral shifting of the track members and nozzle means toward or away from each other and arranged and constructed to simultaneously actuate said valve means in such a manner that the nozzle means is open a relatively small amount when the track members and nozzle means have their spacing adjusted for small bearings and that the nozzle means is open a substantial amount when the track members and nozzle means have their spacing adjusted for large bearings.

2. A ball bearing washing machine comprising a supporting structure, longitudinally extending, spaced, parallel track members carried on said supporting structure, said track members adapted to slidably receive annular bearings, nozzle means disposed above each of said track members and carried on said supporting structure, said nozzle means having openings arranged and constructed to direct streams of wash fluid on the bearings on said track members, a pair of frame members positioned parallel to each other and adapted for slidable movement on said supporting structure, each of said frame members carrying one of said track members, said supporting structure having a portion projecting above said track members, said portion carrying guide tracks extending upwardly and outwardly from each side of a longitudinal center line through said bearing washing machine for slidably receiving said nozzle means, said nozzle means having upwardly and inwardly inclined grooves, means for moving said frame members toward and away from each other, and projecting means affixed to said frame members and having roller members on the ends thereof for sliding engagement with the grooves in the nozzle means, whereby when the frame and track members are laterally adjusted the nozzle means are simultaneously moved along the upwardly and outwardly inclined guide tracks.

3. A device as set forth in claim 2 comprising slide valve means connected to said nozzle means for varying the effective size of the nozzle means openings, second projection means affixed to said frame members, and connecting means between said slide valve means and said second projection means, said connecting means arranged and constructed to effect lateral sliding movement of the slide valve means with the frame members and to permit relative vertical movement therebetween.

4. A device as set forth in claim 3 in which the first projection means affixed to the frame members are bent inwardly toward each other at their upper roller member carrying ends, said second projection means disposed in a vertical position, said connecting means including longitudinally spaced rollers on said slide valve means for receiving the second projection means therebetween, whereby lateral shifting of the slide valve means is accelerated over the lateral shifting of the nozzle means.

5. In a ball bearing washing machine including a longitudinally extending track on which ball bearings are moved in one direction, nozzle means positioned laterally adjacent each side of the track and having stream outlets arranged in a manner to direct a washing fluid on the ball bearings moved along the track, and said stream outlets on one nozzle means inclined longitudinally in one direction and on the other nozzle means inclined longitudinally in the opposite direction, whereby the inner race and balls in the ball bearing are caused to rotate with respect to the outer race supported by the track.

6. In a ball bearing washing machine including a longitudinally extending track on which ball bearings are moved in one direction, nozzle means positioned laterally adjacent each side of the track and having stream outlets arranged in a manner to direct a washing fluid on the ball bearings moved along the track, said track having a first portion and a second portion, said nozzle means extending substantially the length of both portions of the track, and said stream outlets on one nozzle means inclined longitudinally in a first direction adjacent the first portion of the track and inclined longitudinally in a second direction adjacent the second portion of the track, and the stream outlets in said other nozzle means inclined longitudinally in the second direction adjacent the first portion of the track and inclined longitudinally in the first direction adjacent the second portion of the track, whereby the inner race and balls of the bearings on the track will be rotated by wash fluid discharged through the stream outlets in one direction during the travel of the ball bearings over the first portion of the track and rotated in the opposite direction during the travel of the ball bearings over the second portion of the track.

7. A device as set forth in claim 5 in which brake means is provided in the washing machine to prevent movement of the ball bearings on the track in the opposite direction from which they are moved.

GEORGE D. BEAUDRY.
JOHN T. LONGDON.
THEODORE R. BRINK.

References Cited in the file of this patent

UNITED STATES PATENTS

| Number | Name | Date |
| --- | --- | --- |
| 972,649 | Rose | Oct. 11, 1910 |
| 1,411,380 | Roof | Apr. 4, 1922 |
| 1,766,208 | Anstiss | June 24, 1930 |
| 1,878,277 | Hodge | Sept. 29, 1932 |
| 1,886,378 | Dearsley | Nov. 8, 1932 |
| 1,894,786 | Pew | Jan. 17, 1933 |
| 1,934,494 | Gillespie | Nov. 7, 1933 |
| 1,977,670 | Darling | Oct. 23, 1934 |
| 2,159,132 | Chalmers | May 23, 1939 |
| 2,305,655 | Woolford | Dec. 22, 1942 |
| 2,369,498 | Streuber | Feb. 13, 1945 |
| 2,484,149 | Bousky | Oct. 11, 1949 |

FOREIGN PATENTS

| Number | Country | Date |
| --- | --- | --- |
| 124,427 | Australia | Nov. 28, 1946 |